Figure 1:
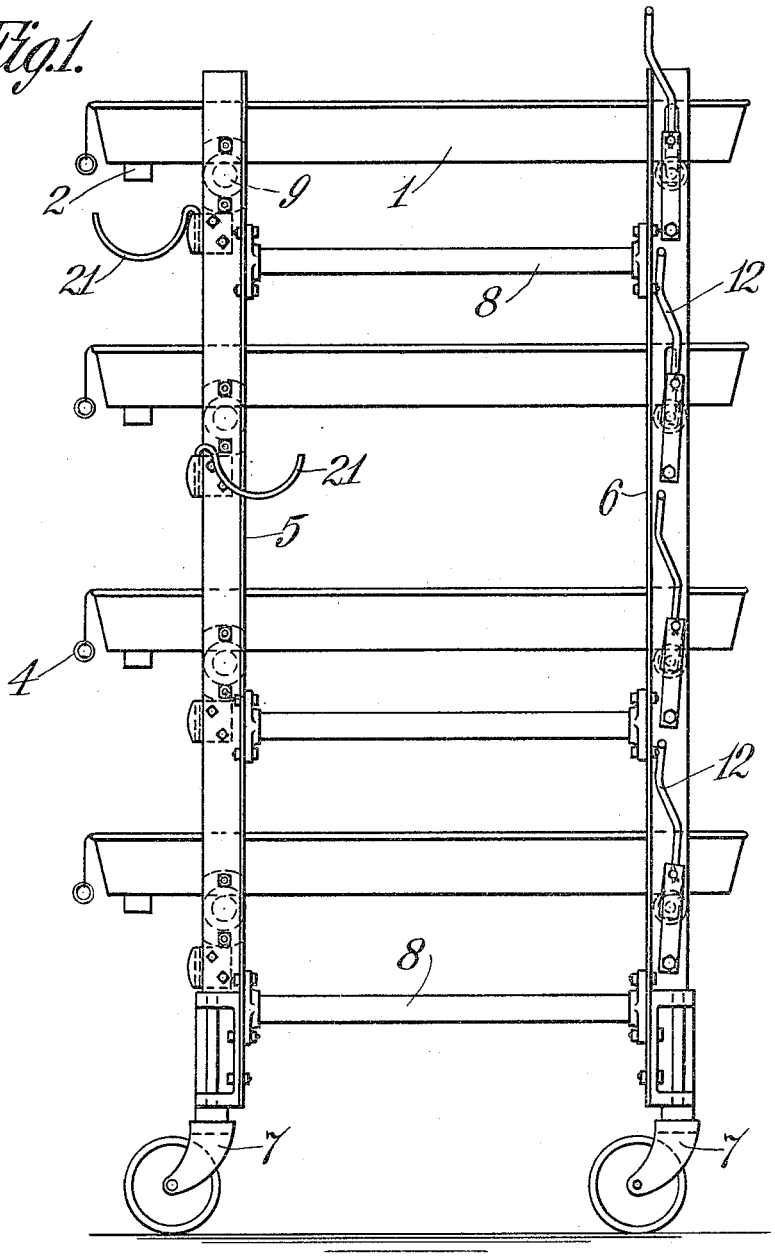

R. J. CLEELAND.
APPARATUS FOR USE IN CANDY MAKING.
APPLICATION FILED JUNE 12, 1914.

1,145,119.

Patented July 6, 1915.
5 SHEETS—SHEET 1.

WITNESSES:
H. E. Hartwell.
Caroline N. Willis.

INVENTOR.
Robert J. Cleeland.
BY
Chapin + Co.
ATTORNEYS

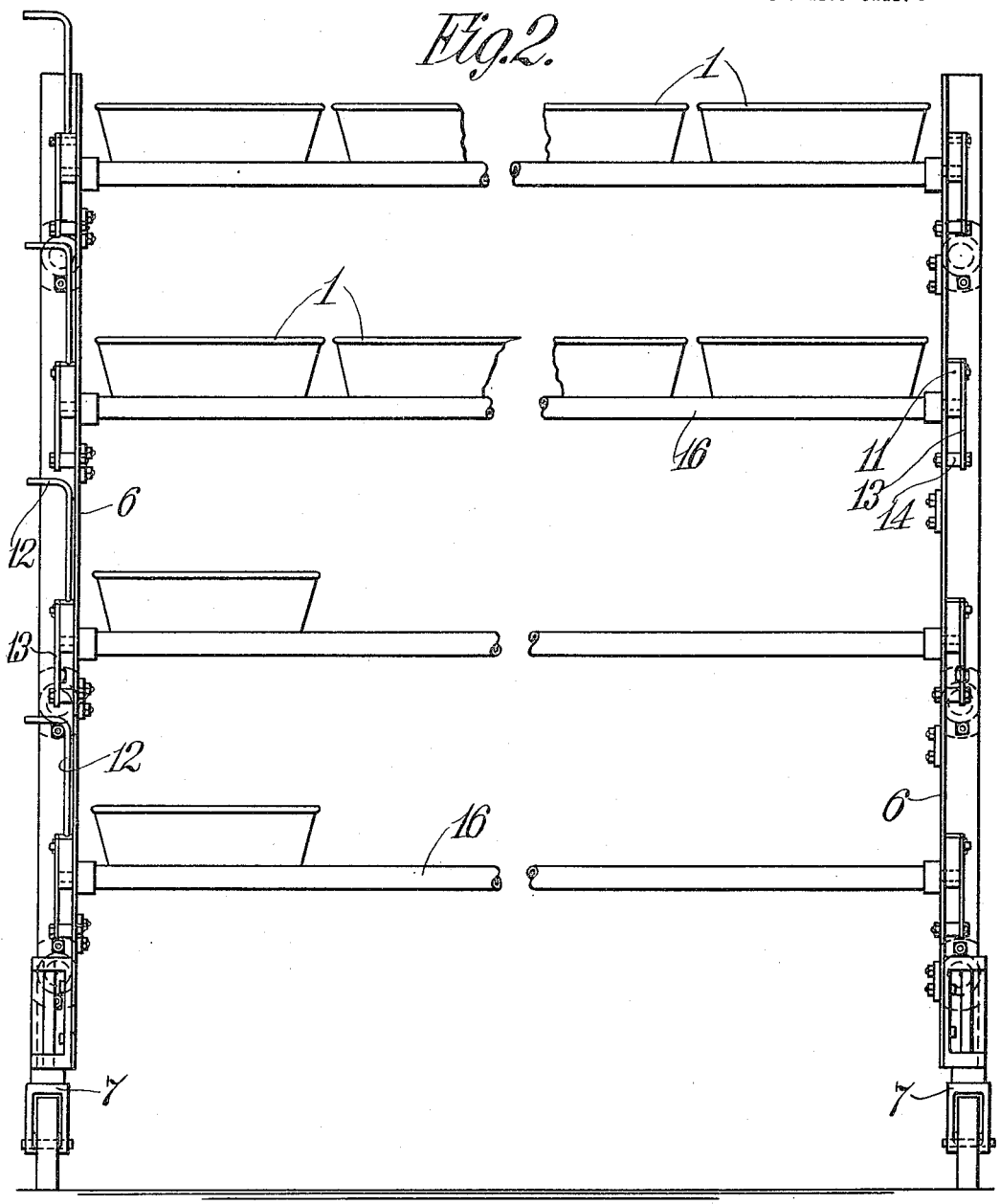

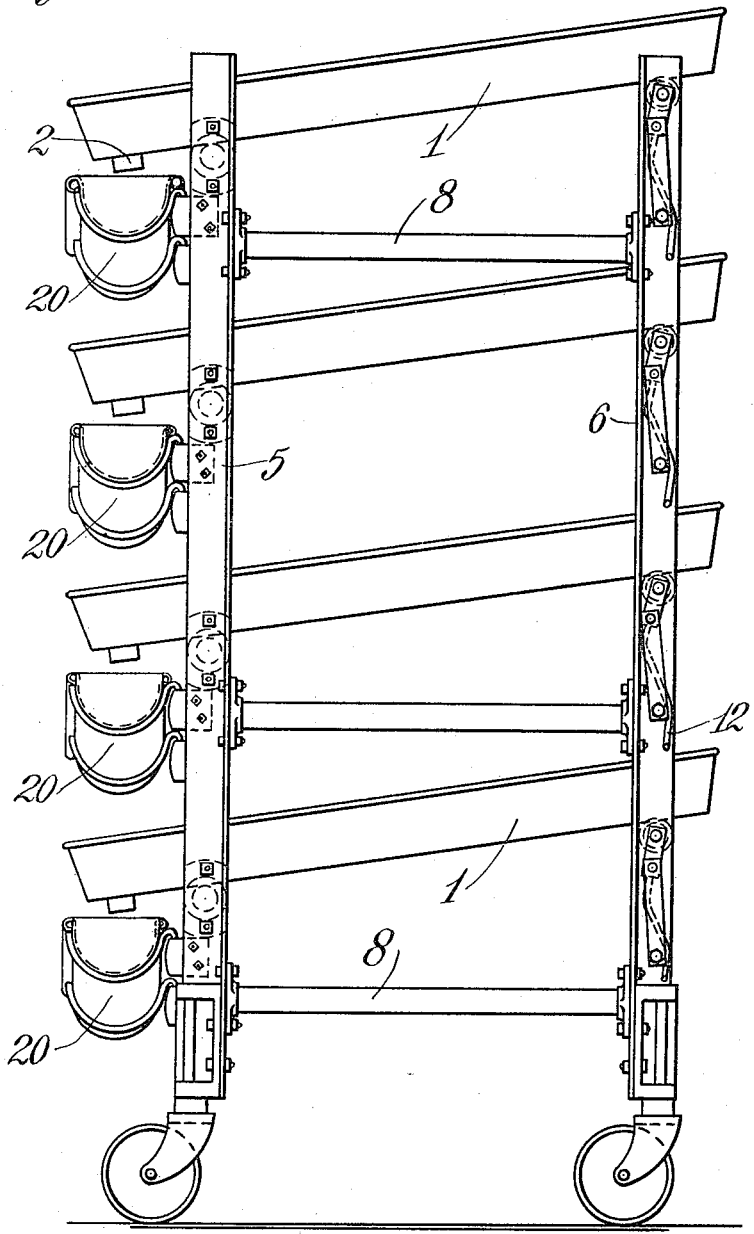

R. J. CLEELAND.
APPARATUS FOR USE IN CANDY MAKING.
APPLICATION FILED JUNE 12, 1914.
1,145,119.
Patented July 6, 1915.
5 SHEETS—SHEET 4.
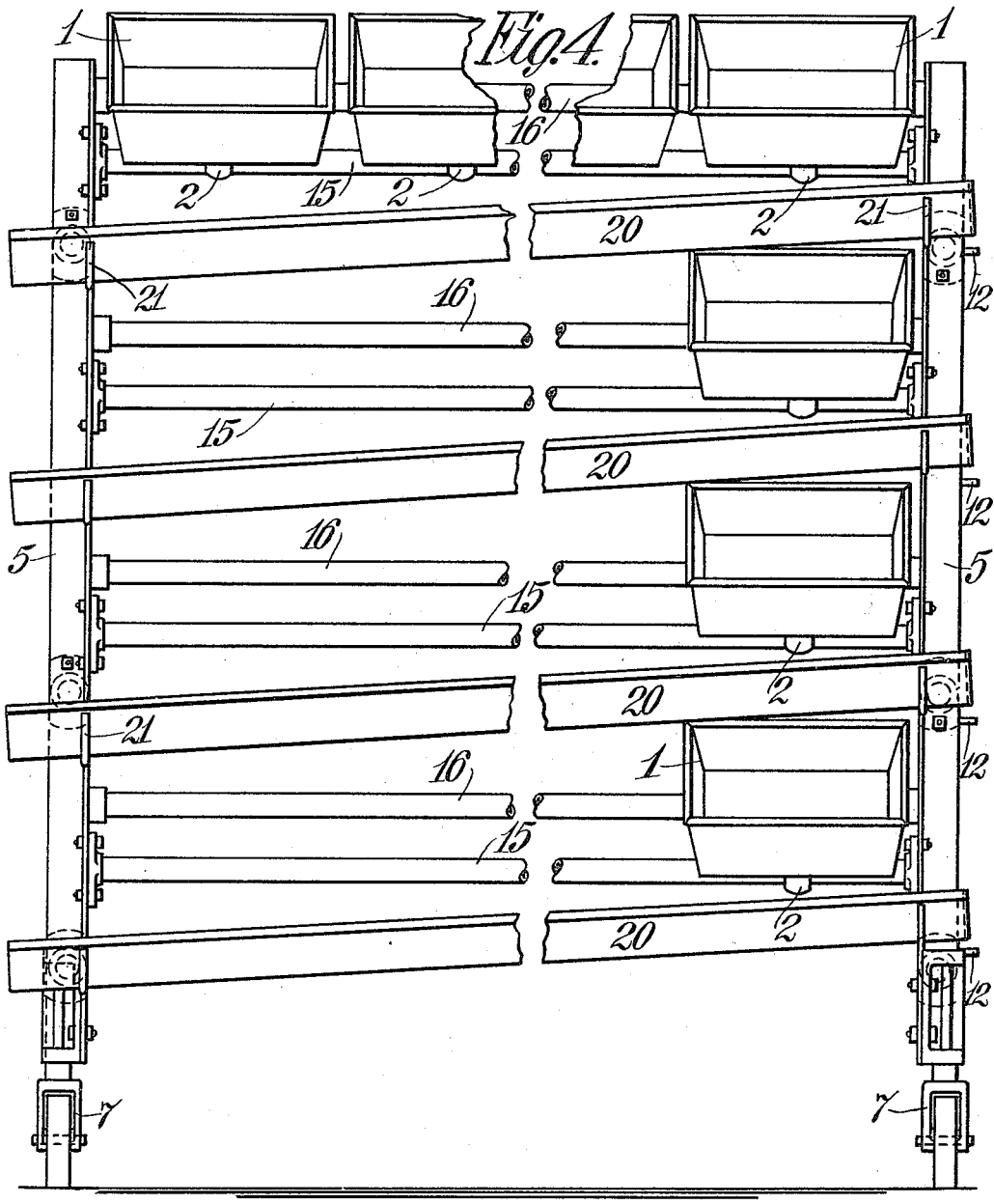
WITNESSES:
INVENTOR.
Robert J. Cleeland.
BY
Chapin & Co.
ATTORNEYS R. J. CLEELAND.
APPARATUS FOR USE IN CANDY MAKING.
APPLICATION FILED JUNE 12, 1914.
1,145,119.
Patented July 6, 1915.
5 SHEETS—SHEET 5.
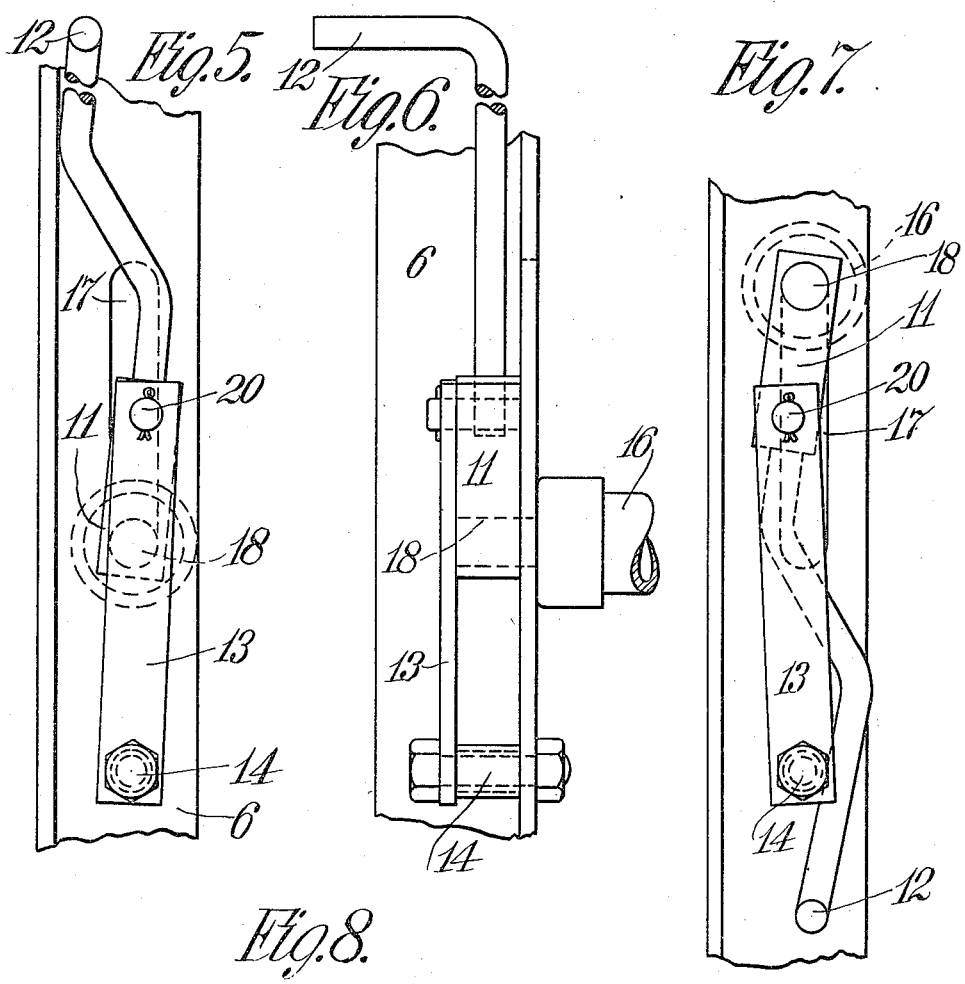
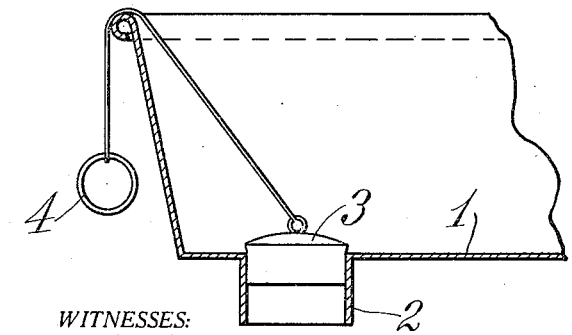
WITNESSES:
INVENTOR.
Robert J. Cleeland.
BY
ATTORNEYS

UNITED STATES PATENT OFFICE.

ROBERT J. CLEELAND, OF SPRINGFIELD, MASSACHUSETTS.

APPARATUS FOR USE IN CANDY-MAKING.

1,145,119.  Specification of Letters Patent.  Patented July 6, 1915.

Application filed June 12, 1914. Serial No. 844,650.

*To all whom it may concern:*

Be it known that I, ROBERT J. CLEELAND, a citizen of the United States of America, residing in the city of Springfield, county of Hampden, and State of Massachusetts, have invented new and useful Improvements in Apparatus for Use in Candy-Making, of which the following is the specification.

This invention relates to an apparatus for crystallizing candy and is especially adapted for saving labor in handling large quantities of candy in a short space of time.

On many grades of candy, the crystallizing process is briefly as follows: The candy prior to the process is formed of the required size and shape. It is then put in suitable pans, the quantity in each pan being about the amount the pan can carry. Syrup which has been boiled to the required degree at a given temperature is put in each pan until the candy therein is immersed. The pans, full of syrup and candy, are left undisturbed for a given length of time during which time the candy absorbs or takes on a necessary coating of the syrup crystallizing on the candy. The excess syrup is then drained from the pans, and the candy is left with a crystallized surface coating. The usual steps are then in brief—to fill the pans with candy, then with syrup, allow them to stand a given time, drain off the syrup, and take out the candy. In this process, it has been customary to use pans of rather small capacity in order to permit an operator to handle them conveniently. On account of the weight of the pan full of candy and sometimes very hot syrup, it would be dangerous as well as inconvenient for the pan, under ordinary practice, to be of any considerable size.

The object of this invention is to provide novel and useful rack and pans for use in the crystallizing process whereby the goods crystallized may be handled more conveniently than heretofore, and, therefore, in larger quantities at a greater rate of speed.

A further object is to provide an improved rack for crystallizing pans adapted to hold the latter so that any one may be separately removed at will to be filled with candy, scraped, or otherwise used and, when on the rack, may be with others held either in position to permit the crystallizing process to continue or tipped into draining position to separate the excess syrup from the candy.

A further object is to provide an improved rack for use in crystallizing candy embodying supporting means for separate tiers of crystallizing pans from which any of the pans may be separately removed at will and means to tip the pans in independent groups to drain off the syrup.

A further object is to provide an improved rack having improved draining means for the excess syrup in the crystallizing process.

A further object is to provide improved rack and pans of general application in the crystallizing process whereby large quantities of candy may be handled expeditiously with a resulting saving in floor space, labor, and time.

Other objects of the invention will appear as the description thereof proceeds and will be defined more particularly in the annexed claims.

My invention, in the preferred form chosen for the purpose of illustration, comprises, in general, a portable rack adapted to support at different levels separate groups of crystallizing pans, with means for tipping at will each group into syrup-draining position and holding it in that position as long as desired. The pans may be removed from the rack and replaced thereon independently. Draining means are provided for each group of pans to receive the excess syrup and guide it to a suitable receptacle. Each pan is made of large capacity as compared to those heretofore used and is preferably provided in its bottom with an opening arranged to occupy a position above the draining means for its group. A closure is provided for each opening so that the syrup may be held in the pan until time for draining when the closure is removed, and the syrup flows into the draining means. When most of the syrup has been drained, the pans are tipped and held in that position to insure a thorough draining.

The invention is defined in the accompanying claims, and a clear understanding thereof will be obtained from the claims and the following specific description of the preferred form used as a basis. It is well understood, however, that the invention may be carried out with other specific structure than that now to be described.

Referring to the drawings Figure 1 is an end elevation of the rack and pans assembled in normal position. Fig. 2 is a rear elevation of the same with parts removed to shorten the length to the requirement of the sheet. Fig. 3 is a view similar to Fig. 1 showing the elevating and locking means in position to hold the pans in tipped or draining position and the draining means in position to receive the excess syrup. Fig. 4 is a front view of the apparatus as arranged in Fig. 3. Figs. 5, 6, and 7 are detail views showing the elevating and locking mechanism for tipping and holding the pans in draining position. Fig. 8 is a detail sectional view of the forward end of the pan showing its draining opening and the removable closure therefor.

Referring to Fig. 4, the rack proper comprises a rectangular metal frame made up at the ends of vertical angle iron members 5 and 6 held together in spaced position by the cross tubes 8 bolted at the ends rigidly thereto. Extending from the members 5 at each end of the rack are the horizontally arranged parallel tubes or rods 15. The latter are securely bolted at their ends to said members. Connecting the members 6 (see Figs. 5 and 6) are similar tubes 16. These, however, are arranged to each have a limited vertical movement in slots 17 with which they connect by means of stud caps 18. A link 11 is pivoted at one end to the stud 18 after the latter passes through its slot 17. The other end of link 11 is pivoted to the upper end of a link 13 which in turn is pivoted at its lower end on pivot-stud 14, bolted to member 6. The handle 12 has one end securely fixed in the end of link 11, as shown. The connections of the tubes 16 with the members 6 are in each case the same. That is to say, opposite parallel slots 17, one in each member 6, receive the studs 18 one at each end of a tube 16, and these studs are each connected to a link structure 11 and 13, as described. When the tubes 16 are in their lower positions, the center of 18 (see Fig. 5) lies to the left of the line joining centers 14 and 20. If the handle 12 is swung from the position shown in Fig. 5 to that shown in Fig. 7, the links 11 and 13 at each end of tube 16 will be forced to the position shown in Fig. 7. This movement of the links 11 and 13 causes tube 16 to rise in the slots 17 at each end. The center 20 will lie, as shown in Fig. 7, to the left of the line joining centers 14 and 18. The weight of the tube 16 tends to force links 11 and 13 further to the left, but, inasmuch as the handle 12 is now resting against the pivot-stud 14, further movement is prevented. By this structure then, a separate toggle-elevating means is provided for each tube 16, and the elevating means is self-locking in a convenient manner. As shown, handles 12 are provided only at one end of the rack, but they can obviously be provided at both ends if desired. These handles provide an adequate lever means for raising, lowering, and locking the supporting tubes 16. Each tube 16, when in low down position, is parallel to and opposite a corresponding fixed tube 15. When a tube 16 is raised, it is still parallel with its corresponding tube 15 but slightly elevated above that tube. The crystallizing pans 1 are adapted to be supported at the front end on tubes 15 and at the rear end on tubes 16 in either raised or lowered position.

The type of pan designed for use in connection with this apparatus is best shown in Figs. 1 and 8. It comprises a rectangular pan 1 open at the top only but provided with a draining opening 2, centrally located near the front edge of the pan. A stopper 3, conveniently made of rubber and provided with string connection to a finger-ring 4, is used to close and open this outlet 2. The pan is preferably of such a size that, when filled with candy to be crystallized, it is about the limit in weight for the ordinary workman to lift and handle conveniently. In this way, the workman is kept to his greatest efficiency.

The drawings illustrate a rack for holding four rows of pans, one above the other. The pans in each row are supported by longitudinal tubes 15 and 16 with the draining openings 2 in line one with the other. A draining gutter 20 is provided at the side of the rack for each row of pans, and each gutter is removably supported in swinging brackets pivoted as shown (see Fig. 1) to the members 5. The brackets 21, supporting each gutter 20, are arranged at different levels so that the gutter resting therein slants toward one end of the machine. These draining gutters and brackets are removable and are designed for use only during the draining operation.

With the apparatus built as described, the preferred operation is as follows: The rack, as shown in Fig. 1, is rolled on the casters 7 to the bench containing the candy to be crystallized. The operator takes one pan after the other from the rack, fills it nearly full, and replaces it. The stoppers 3 are in place, as shown in Fig. 8. When the pans are loaded, the rack is rolled to the crystallizing floor. The operator now fills each pan with the crystallizing syrup until the candy therein is completely immersed. This is conveniently done by a hose connection to the syrup tank and a motor operated pump under the control of the operator. After the pans are filled, the rack remains, as shown in Fig. 1 usually during the night. In the morning, the operator places the draining gutters 20 in place on the brackets 21 on the side of the rack and all slanting in the same direction. The stoppers 3 are then pulled by means of the finger-rings 4, and the excess syrup flows into the gutters 20 to any suitable receptacle placed at the end of the machine. When the greater part has left the pans 1, the operator, by means of handles 12 (see Figs. 3 and 4), elevates and locks the rear ends of each row of pans in tipped position. If desired the front ends of the pans may be lowered and thus tipped by mechanism equivalent to the elevating means and in this arrangement the rear ends would be held stationary. The full weight of pans, candy and syrup would then never need to be raised all together. The pans are left in tipped position for some time. A large amount of syrup, which would otherwise stay in the pans, is thus caused to flow downwardly and out the openings 2 into the gutters. In this way, the pans and the candy therein are all thoroughly drained. When the draining operation is finished, the rack may be rolled to a bench on which the candy is emptied from the pans. It is desirable to then move the rack alongside a suitable receptacle and scrape any crystallized syrup adhering to the surface of the pans into said receptacle. The apparatus designed as described reduces the amount of "scrapings" from the pans to a minimum, first, because of the large volume of the pans in relation to their surface as compared to those formerly used, and, second, because of the thorough draining from each pan while in its tipped position. Where large quantities of candy are to be crystallized, the saving due to the small amount of scraping resulting from the process, is of material assistance in cutting down the cost of the goods.

From the foregoing description of the apparatus and operation, I believe the advantages of my invention will be clear to those skilled in the art. The structure is purposely reduced to the simplest form of which I am now aware for carrying out the crystallizing process. The full value of the apparatus, however, is best understood, not from a consideration of the bare structure alone, but, from a consideration of the structure in its relation to the use for which it is designed.

Having disclosed the best form and mode of using my invention, of which I am now aware, I wish it understood that the invention, as defined in the accompanying claims, may be carried out with various other specific structures which are not specifically disclosed herein.

What I claim is—

1. In combination, a series of shallow pans the bottom of each provided with an outlet opening, a stopper for each outlet, a rack for supporting the pans, a trough arranged under the outlet openings, and means associated with the rack for tipping the pans at will.

2. A rack for use in crystallizing candy, comprising, two horizontally arranged supporting devices in combination with a series of crystallizing pans adapted to be supported at their ends on said devices, one of said devices being movable vertically in the rack, and mechanism for raising said movable device at will whereby the pans may be tipped for the draining operation.

3. A rack for use in crystallizing candy, comprising, two horizontally arranged supporting devices in combination with a series of crystallizing pans adapted to be supported at their opposite ends on said devices, mechanism to elevate one of said devices and thus the ends of the pans supported by said devices for the draining operation, said mechanism including means to lock the device in elevated position.

4. A rack for use in crystallizing candy, comprising, a skeleton frame including a series of parallel and vertically spaced supporting devices, each supporting device including two horizontally arranged rods one of which is movable vertically, and mechanism to elevate each of the movable rods at will.

5. In combination with a series of crystallizing pans, a rack including supporting devices adapted to support several sets of said pans, each set vertically spaced from the others, and means to elevate each set of pans to occupy a tipped or draining position.

6. A rack adapted to support a plurality of crystallizing pans, comprising, a skeleton frame mounted on wheels, horizontally arranged supporting means adapted to receive the pans, and mechanism to elevate a part of said means whereby the pans thereon are tipped.

7. A rack adapted to support tiers of crystallizing pans in vertically spaced relation, comprising, a skeleton frame having longitudinal supporting means at different levels on which the pans rest, mechanism to elevate part of said means to tip the pans in each tier at will, and gutters arranged on the frame, one under the ends of the pans in each tier adapted to receive the drainings from the pans when tipped.

8. A candy making machine, comprising, in combination, a portable rack consisting of suitably braced end and side skeleton frame members, the end frame members being connected by vertically spaced pairs of supporting rods, the rods of each pair extending horizontally along opposite sides of the rack and one rod of each pair being mounted for limited vertical movement from the horizontal plane of its companion rod to a horizontal plane above the companion rod, toggle elevating mechanism arranged to operate each movable rod independently, said toggle mechanism being constructed to automatically lock as the centers change position, a series of pans adapted to rest on said pairs of supporting rods, each pan being open at the top and comprising closed side and bottom walls, the bottom wall being provided with an outlet opening and a stopper therefor, a series of vertically spaced gutters mounted in the machine, one arranged below the openings of all pans on each single pair of supporting rods.

9. A draining apparatus, comprising, in combination, a series of independent pans, supporting means for said pans and mechanism to operate said supporting means to hold the pans in level or tipped position for draining, said supporting means being constructed to hold the series of pans one independently of the others and in position for each of the pans to be independently removed from or placed on the supporting means.

10. A draining apparatus, comprising, in combination, a series of independent pans, supporting means for said pans constructed to hold one above the other in spaced and independent relation, whereby they can be removed in any order, and mechanism associated with the supporting means to hold the pans in level or tipped position for draining.

ROBERT J. CLEELAND.

Witnesses:
F. G. NEAL,
H. E. HARTWELL.

Copies of this patent may be obtained for five cents each, by addressing the "Commissioner of Patents, Washington, D. C."